US011416837B2

(12) United States Patent
Kurylko et al.

(10) Patent No.: US 11,416,837 B2
(45) Date of Patent: Aug. 16, 2022

(54) METHODS, SYSTEMS, AND COMPUTER READABLE MEDIA FOR ELECTRONICALLY FACILITATING STREAMING PAYMENTS

(71) Applicant: Mastercard International Incorporated, Purchase, NY (US)

(72) Inventors: Marek Kurylko, Bloomfield, NJ (US); Eugene Reda, Little Falls, NJ (US); Skyler Fox, Park Ridge, NJ (US)

(73) Assignee: MASTERCARD INTERNATIONAL INCORPORATED, Purchase, NY (US)

(*) Notice: Subject to any disclaimer, the term of this patent is extended or adjusted under 35 U.S.C. 154(b) by 124 days.

(21) Appl. No.: 16/696,985

(22) Filed: Nov. 26, 2019

(65) Prior Publication Data
US 2021/0158317 A1   May 27, 2021

(51) Int. Cl.
*G06Q 20/12* (2012.01)
*H04L 9/40* (2022.01)
*G06Q 20/10* (2012.01)

(52) U.S. Cl.
CPC ....... *G06Q 20/1235* (2013.01); *G06Q 20/102* (2013.01); *G06Q 20/127* (2013.01); *H04L 63/102* (2013.01); *H04L 63/108* (2013.01)

(58) Field of Classification Search
CPC .................................................... G06Q 20/00
See application file for complete search history.

(56) References Cited

U.S. PATENT DOCUMENTS

| 8,825,887 | B2* | 9/2014 | Jennings ............... H04L 65/602 |
| | | | 709/227 |
| 9,916,601 | B2* | 3/2018 | Mahadevan ....... G06Q 30/0264 |
| 10,089,651 | B2* | 10/2018 | Mahadevan ....... H04N 21/2396 |
| 10,361,802 | B1* | 7/2019 | Hoffberg-Borghesani .................. |
| | | | G06F 3/00 |

(Continued)

OTHER PUBLICATIONS

Secure Digital Payments IEEE 1999 (Year: 1999).*
"Monitoring High-Frequency Data Streams in FinTech: FADO Versus KK-Means" IEEE 2020 (Year: 2020).*

*Primary Examiner* — Bruce I Ebersman
(74) *Attorney, Agent, or Firm* — Jenkins, Wilson, Taylor & Hunt, P.A.

(57) ABSTRACT

Methods, systems, and computer readable media for electronically facilitating streaming payments are provided. An exemplary method includes receiving a request to access protected media content hosted by a content provider, determining a minimum currency increment based on a user designated payment type, and establishing a predefined content increment that corresponds to the protected media content. The method further includes determining a minimum session expense ratio based on the minimum currency increment and the predefined content increment, initiating a user session that permits access to the protected media content, and determining a quantification of protected media content that is consumed at a termination of the user session. The method also includes using the minimum session expense ratio and the quantification to determine an on-demand streaming payment amount and utilizing the user designated payment type to determine a manner of routing the on-demand streaming payment amount to a payment processing entity that is configured to facilitate a payment transaction.

11 Claims, 5 Drawing Sheets

(56) References Cited

U.S. PATENT DOCUMENTS

| | | | |
|---|---|---|---|
| 10,853,826 B2* | 12/2020 | Romagnolo | G06Q 30/0203 |
| 2002/0013948 A1* | 1/2002 | Aguayo, Jr. | H04N 21/43615 |
| | | | 348/E7.071 |
| 2002/0071556 A1* | 6/2002 | Moskowitz | H04N 21/2347 |
| | | | 348/E7.056 |
| 2003/0233540 A1* | 12/2003 | Banerjee | H04L 63/0428 |
| | | | 713/153 |
| 2004/0122746 A1* | 6/2004 | Charlier | G06Q 30/0641 |
| | | | 705/27.1 |
| 2004/0177240 A1* | 9/2004 | Yang | G06F 9/4401 |
| | | | 713/1 |
| 2004/0181667 A1* | 9/2004 | Venters, III | H04L 9/0891 |
| | | | 713/164 |
| 2004/0254887 A1* | 12/2004 | Jacoby | H04N 21/835 |
| | | | 348/E7.071 |
| 2006/0280303 A1* | 12/2006 | Gupte | H04N 21/835 |
| | | | 380/239 |
| 2006/0282389 A1* | 12/2006 | Gupte | G06Q 30/02 |
| | | | 705/52 |
| 2007/0179897 A1* | 8/2007 | Andersson | H04L 63/0807 |
| | | | 705/59 |
| 2008/0172291 A1* | 7/2008 | Hurowitz | G06Q 30/02 |
| | | | 705/14.1 |
| 2008/0172292 A1* | 7/2008 | Hurowitz | G06Q 30/02 |
| | | | 725/23 |
| 2008/0263610 A1* | 10/2008 | Murray | G06F 16/40 |
| | | | 725/110 |
| 2010/0076994 A1* | 3/2010 | Soroca | G06F 16/635 |
| | | | 707/769 |
| 2010/0131895 A1* | 5/2010 | Wohlert | H04L 65/1059 |
| | | | 709/219 |
| 2010/0280956 A1* | 11/2010 | Chutorash | G06Q 20/202 |
| | | | 705/64 |
| 2010/0325044 A1* | 12/2010 | MacGuire | G06Q 20/40 |
| | | | 705/42 |
| 2011/0103374 A1* | 5/2011 | Lajoie | H04L 65/1023 |
| | | | 370/352 |
| 2012/0150698 A1* | 6/2012 | McClements, IV | G11B 27/034 |
| | | | 705/27.2 |
| 2013/0218838 A1* | 8/2013 | Bevan | G06F 16/00 |
| | | | 707/626 |
| 2014/0330656 A1* | 11/2014 | Zhou | G06Q 20/401 |
| | | | 705/16 |
| 2015/0120535 A1* | 4/2015 | Evans | H04L 65/4069 |
| | | | 709/219 |
| 2015/0312421 A1* | 10/2015 | Leemet | H04L 12/1475 |
| | | | 379/114.03 |
| 2015/0312422 A1* | 10/2015 | Leemet | H04L 12/1435 |
| | | | 455/406 |
| 2017/0346865 A1* | 11/2017 | Hartman | H04L 65/607 |
| 2017/0364999 A1* | 12/2017 | Herriger | G07F 17/32 |
| 2018/0359090 A1* | 12/2018 | Grover | H04L 9/0631 |
| 2020/0052917 A1* | 2/2020 | Corral | H04M 15/64 |
| 2020/0167798 A1* | 5/2020 | Lee | G06N 20/20 |

* cited by examiner

US 11,416,837 B2

METHODS, SYSTEMS, AND COMPUTER READABLE MEDIA FOR ELECTRONICALLY FACILITATING STREAMING PAYMENTS

TECHNICAL FIELD

The subject matter described herein relates to improved methods, systems, and non-transitory computer readable media for electronically providing funds for the payment of media services on an on-demand and streaming basis. More particularly, the subject matter described herein relates to systems, methods, and computer readable media for electronically facilitating streaming payments.

BACKGROUND

At present, a number of different merchants and content providers host media content behind a paywall for consumption by paying consumers. Such content can include news sources (e.g., digital newspapers or periodicals), reference sources (e.g., medical journals, technical reports, etc.), entertainment media (e.g., sports media, software gaming platforms, etc.), and the like. However, present subscription models implemented by content providers are not sufficiently flexible to drive interest and engagement from consumers. In particular, these consumers are either unsure of the quality of the offered content by the content provider or have a very limited interest (if any) in a prolonged relationship with the content provider. As such, prospective customers are reluctant to immediately initiate and commit to a monthly or annual payment with a content provider.

Accordingly, there exists a need for improved methods, systems, and computer readable media for electronically facilitating streaming payments for media services.

SUMMARY

According to one aspect, the subject matter described herein relates to methods, systems, and computer readable media for electronically facilitating streaming payments. An exemplary method is performed at a content provider server that includes at least one processor. The method includes receiving a request to access protected media content hosted by a content provider, determining a minimum currency increment based on a user designated payment type, and establishing a predefined content increment that corresponds to the protected media content that is requested for access. The method further includes determining a minimum session expense ratio based on the minimum currency increment and the predefined content increment, initiating a user session that permits access to the protected media content, and determining a quantification of protected media content that is accessed at a termination of the user session. The method also includes using the minimum session expense ratio and the quantification of protected media content to determine an on-demand streaming payment amount and utilizing the user designated payment type to determine a manner of routing the on-demand streaming payment amount to a payment processing entity that is configured to facilitate a payment transaction for the protected media content accessed during the session time period.

In one example, the method also includes receiving an enrollment indication message containing the user designated payment type for a streaming payment subscription associated with protected media content.

In one example of the method, the user session is placed on hold up to predefined time period after the access to the protected media content ceases.

In one example of the method, the user session is resumed if the access to the protected media content is continued prior to an expiration of the predefined time period.

In one example of the method, the user session is terminated if the predefined time period expires.

In one example, the method includes visually presenting a current on-demand streaming payment amount in units based on the minimum currency increment during the access of the protected media content on at least a portion of a screen display that is also used to present the protected media content.

In one example of the method, the quantification of protected media content is measured using at least one of: a number of bytes, a number of words, a number of web pages, a number of images, or an amount of elapsed time.

In some embodiments, an exemplary system for electronically facilitating streaming payments is provided. The system includes a content provider server comprising at least one processor and memory. The system further includes a session logic engine stored in the memory and when executed by the at least one processor is configured to receive a request to access protected media content hosted by a content provider, determine a minimum currency increment based on a user designated payment type, establish a predefined content increment that corresponds to the protected media content that is requested for access, determine a minimum session expense ratio based on the minimum currency increment and the predefined content increment, initiate a user session that permits access to the protected media content, determine a quantification of protected media content that is accessed at a termination of the user session. The system also includes a session settlement engine stored in the memory and when executed by the at least one processor is configured to use the minimum session expense ratio and the quantification of protected media content to determine an on-demand streaming payment amount and utilize the user designated payment type to determine a manner of routing the on-demand streaming payment amount to a payment processing entity that is configured to facilitate a payment transaction for the protected media content accessed during the session time period.

In one example of the system, the content provider server is further configured to receive an enrollment indication message containing the user designated payment type for a streaming payment subscription associated with protected media content.

In one example of the system, the session logic engine is further configured to place the user session on hold up to predefined time period after the access to the protected media content ceases.

In one example of the system, the session logic engine is further configured to resume the user session if the access to the protected media content is continued prior to an expiration of the predefined time period.

In one example of the system, the session logic engine is further configured to terminate the user session if the predefined time period expires.

In one example of the system, the content provider server is further configured to visually present a current on-demand streaming payment amount in units based on the minimum currency increment during the access of the protected media content on at least a portion of a screen display that is also used to present the protected media content.

In one example of the system, the quantification of protected media content is measured using at least one of: a number of bytes, a number of words, a number of web pages, a number of images, or an amount of elapsed time.

The subject matter described herein may be implemented in hardware, software, firmware, or any combination thereof. As such, the terms "function", "engine", or "node" as used herein refer to hardware, which may also include software and/or firmware components, for implementing the features being described. In one exemplary implementation, the subject matter described herein may be implemented using a non-transitory computer readable medium having stored thereon computer executable instructions that when executed by the processor and memory of a computer control the computer to perform steps.

Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

Preferred embodiments of the subject matter described herein will now be explained with reference to the accompanying drawings, wherein like reference numerals represent like parts, of which.

DETAILED DESCRIPTION

In accordance with the subject matter disclosed herein, methods, systems, and computer readable media for electronically facilitating streaming payments are provided. In some embodiments, methods, systems, and computer readable media described herein are not manual (e.g., not capable of performance by a human being alone), but rather are accomplished by virtue of electronic messaging exchanged between and within various network entities (e.g., computing platforms, computing applications, computing devices, etc.) via a communications network in order to conduct the on-demand streaming payments corresponding to protected media content hosted by a paywall site. Notably, implementation of the disclosed subject matter affords a new subscription model option to the merchant and potential consumer. For example, the described on-demand streaming payment subscription model option presents an opportunity to increase the size of the content provider's user/customer base. Further, increased payment frequency for protected media content is also realized (i.e., a content provider merchant entity will not have to wait for the Xth of the month for payment). The new subscriber model option also presents the consumer certain benefits. In particular, the consumer user is able to receive a more personalized and flexible media consumption experience. In addition, a consumer is provided with the ability to select a convenient payment method from among multiple payment options, including include real-time payment networks and DLT based facilitators.

Reference will now be made in detail to exemplary embodiments of the subject matter described herein, examples of which are illustrated in the accompanying drawings. Wherever possible, the same reference numbers will be used throughout the figures and refer to the same or like entities.

Figure 1:
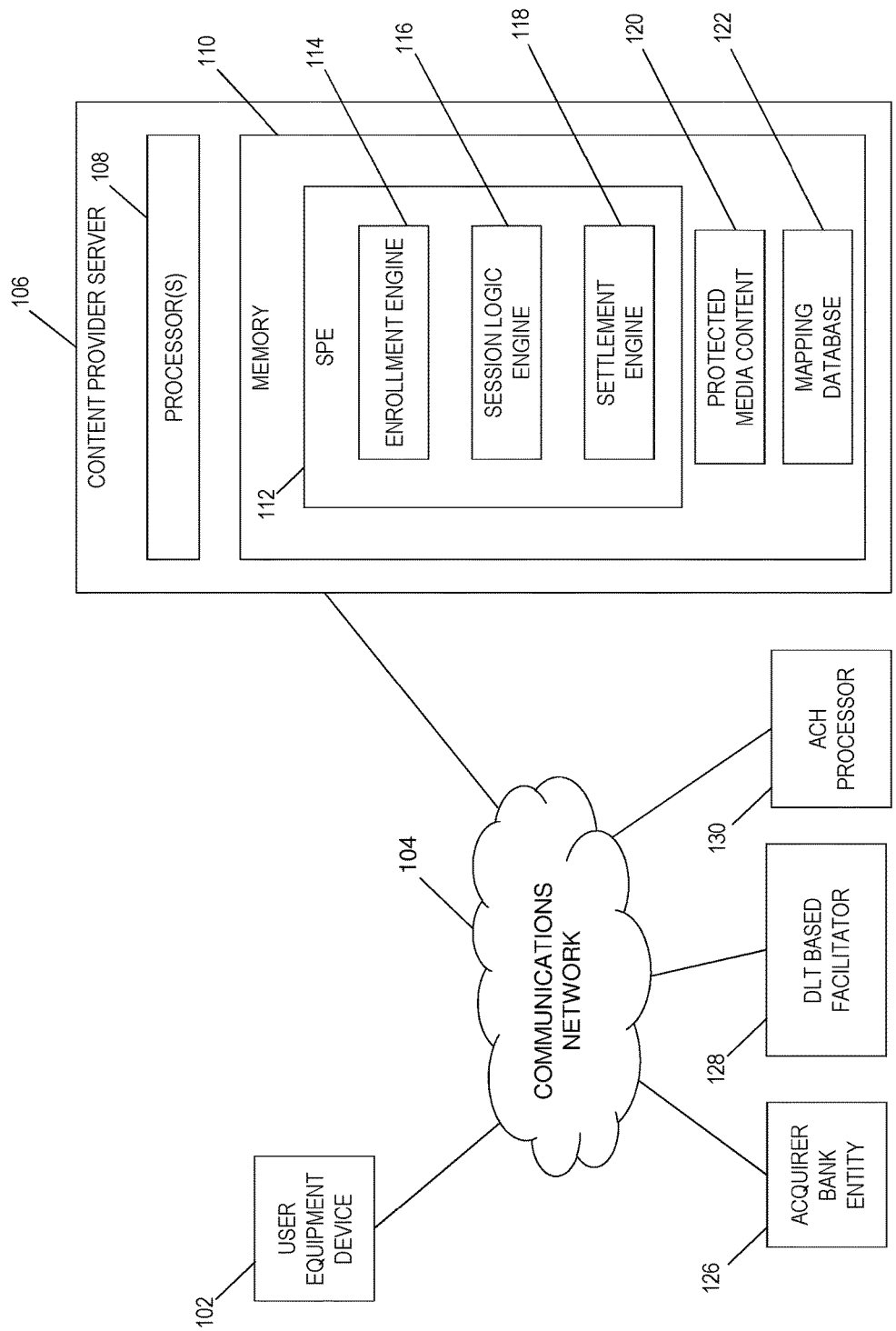
FIG. 1 is a block diagram depicting an exemplary network architecture for electronically facilitating streaming payments according to an embodiment of the subject matter described herein.

FIG. 1 is a schematic diagram illustrating an exemplary computer network system 100 associated with electronically facilitating streaming payments according to an embodiment of the subject matter described herein. As shown in FIG. 1, system 100 includes a user equipment (UE) 102 that is configured to communicate with a content provider server 106 via a communications network 104 (e.g., the Internet).

UE 102 may include any electronic user device that is configured to access content provider server 106 for purposes of requesting and accessing protected media content 120. Exemplary UEs 102 include any type of mobile or non-mobile device such as a smart phone, a smart device, a laptop computer, a tablet computer, a desktop computer, a smart planner or organizer, a streaming media player, a smart television, a wearable computer (e.g., a smart watch), or the like.

In some embodiments, UE 102 may access communications network 104 via signaling across any type of wired or wireless connection or interface (e.g., a wireless area network (WAN), a local access network (LAN), a WiFi connection, a radio access connection, or the like). Network 104 may include any type of communications network through which a paywall website (e.g., a protected media content website) that is hosted by content provider server 106 can be accessed. Content provider server 106 may be managed and operated by a third party entity, such as a content provider merchant entity.

In some embodiments, communications network 104 includes a packet-based communications network (e.g., the Internet) that is accessed by UE 102 via a communications interface. Network 104 is any type of communications network through which signals and/or messages can be exchanged electronically among computing platform entities without departing from the scope of the subject matter described herein. For example, communications network 104 may include a packet-based network, a circuit-switched network, and/or a combination of packet-based and circuit-switched networks.

Although not shown, each individual entity (e.g., UE 102 and content provider server 106) associated with system 100 may reside in an individual (e.g., public or private) network, which may include a same/common network or different networks. Network 104 facilitates communication of media data via packets or packet-based messages, which may be communicated between network entities according to any desired communication protocol as known in the art (e.g., IP, HTTP, TCP, UDP, SIP, or the like).

Content provider server 106 may include one or more processors 108, such as a central processing unit (e.g., a single core or multiple processing cores), a microprocessor, a microcontroller, a network processor, an application-specific integrated circuit (ASIC), or the like. Content provider server 106 may also include memory 110. Memory 110 may comprise random access memory (RAM), flash memory, a magnetic disk storage drive, and the like. In some embodiments, memory 110 may be configured to store a streaming payment engine 112. Streaming payment engine 112 may comprise s software based application that includes one or more application engines, such as an enrollment engine 114, a session logic engine 116, and/or a settlement engine 118. Although depicted as three separate application engines in FIG. 1, two or more of enrollment engine 114, session logic engine 116, and settlement engine 118 may be combined into a single application engine. For example, enrollment engine 114 and settlement engine 118 may comprise two parts of a single application engine. Further, each of enrollment engine 114, session logic engine 116, and settlement engine 118 may comprise a session development kit (SDK).

In some embodiments, a user (e.g., a customer, an enrollee, a subscriber, etc.) utilizing UE 102 can visit a paywall website associated with a content provider merchant. For example, UE 102 can attempt to access protected media content 120, which may be provided via a website or other similar graphical user interface. Notably, access to protected media content 120 hosted behind a paywall may require a subscriber user to enroll or submit a periodic subscription payment (e.g., a monthly subscription model) or some other mode or type of payment. For example, enrollment engine 114 on content provider server 106 may present the user the option to enroll in an on-demand streaming subscription model. After selecting this option, the user is prompted to provide user enrollment information to content provider server 106 in order to register in an on-demand streaming payments program. For example, the subscriber user may provide enrollment engine 114 with a full name, email address, billing information, mobile device number, and/or a preferred payment method. Examples of preferred payment methods include a credit card number, a debit card number, a bank account number, a distributed ledger technology (DLT) based application, or any other alternative means for exchanging value. As described herein, an electronic wallet can be configured to support a plurality of different electronic based payment methods, each of which can be used by the end user. In some embodiments, support for the plurality of different electronic based payments can be facilitated by configuring streaming payment engine 112 to execute a separate SDK for each option that is offered/provided to the end user. Notably, the preferred payment method selected by the user will have some impact on the determination of a 'minimum currency increment' utilized by streaming payment engine 112 as described below. In particular, a correlation between the minimum currency increment associated with the selected preferred payment method and the media content increments of the desired protected media content 120 is ultimately established by streaming payment engine 112.

In some embodiments, enrollment engine 114 is configured to parse the enrollment information provided by the user and determine what type of payment method was selected. If the user designated a credit card or debit card as the preferred payment method, then enrollment engine 114 is configured to conduct a pre-authorization procedure to validate the availability of the user's funds. In contrast, if a bank account or an electronic wallet is selected by the enrollee, then enrollment engine 114 is configured to conduct the necessary identification and verification (e.g., one time password (OTP), two factor authentication (2fa), and the like) of the enrollee with the originating banking institution or wallet service provider. Further, if an electronic wallet is selected, the limits or terms of a smart contract specifying the bounds of the user's payment agreement may be established at this time (see below for additional details). Afterwards, the pre-authorization procedure is conducted. Once enrollment engine 114 determines the preferred payment method designated by the user, the enrollment session is successfully completed and terminated.

As indicated above, streaming payment engine 112 in content provider server 106 also includes a session logic engine 116. In some embodiments, session logic engine 116 is embodied as a specialized application, an SDK, or the like. Session logic engine 116 can be configured to track a user's access to, and use of, protected media content 120. Specifically, session logic engine 116 can be adapted to track the amount of media (i.e., a "quantification" of data) consumed during a user's current streaming session in relation to the designated minimum currency increment and the predefined content increment. Notably, the minimum currency increment parameter and the predefined content increment parameter are both established/designated prior to the initiation of the media session that is subject to an on-demand streaming payment subscription. For example, session logic engine 116 is configured to determine the designated minimum currency increment associated with the user's enrollment account as established by enrollment engine 114 (see above). In some embodiments, session logic engine 116 can access the user's enrollment account or profile and ascertain the preferred payment method designated by the user. Using the preferred payment method information, session logic engine 116 can establish the minimum currency increment (e.g., if the preferred payment method is designated as a U.S. bank account, then "one cent" is defined as the minimum currency increment by the session logic engine 116). In some embodiments, session logic engine 116 is configured to designate the predefined content increment based on the consumption method utilized by the user equipment device that is utilized to access the protected media content. For example, a pay-per-line increment may be designated if the protected media content comprises a news article that is accessed on a touchscreen. Alternatively, the predefined content increment may be based on a pay-per-word basis if the user intends to listen to an audio podcast on the UE device. In some embodiments, session logic engine 116 is configured to assess information indicative of the type and/or functionality of the user's specific UE device in order to establish the predefined content increment. For example, session logic engine 116 can receive data from the UE that specifies its technical capabilities (e.g., UE screen size, UE screen resolution, audio playback capabilities, touchscreen capabilities, etc.). In some embodiments, the device capability information can be provided by the user during the enrollment process (e.g., to/via the enrollment engine) and/or by the device itself at the time access to the protected media content is initiated/accessed. Based on the information received from the user or the UE, the session logic engine can determine a content increment that represents the most granular level that is available or feasible for the user to consume the protected media content when utilizing the UE device.

For example, if the UE device is limited to displaying the protected media at a particular resolution or provide the protected media content in a particular manner (e.g., revealing a single line of text at a time), session logic engine 116 is configured to establish the predefined content increment in accordance with the UE device's restricted capabilities. Further, session logic engine 116 can be configured to consider the screen size of the UE device and the font or point size of the text being displayed. In some embodiments, if the protected media content contact is being consumed by scrolling up or down a number of inches on a smartphone screen, the session logic engine can consider the number of pixels of the screen to determine the predefined content increment (e.g., number of line(s) displayed or distance of scrolled content displayed). More specifically, if the session logic engine is configured to determine the amount (i.e., 'quantification') of protected media content consumed based on a measured scrolling distance (e.g., inches or centimeters), session logic engine 116 is adapted to consider the pixel width of the screen display of the UE being in order to establish the predefined content increment. Notably, protected media content displayed on a device screen that has a width of 500 pixels will be consumed both at a different rate and in a different manner (e.g., "lines consumed" will differ) when that same protected media content is displayed on a screen that is 1000 pixels wide.

In some embodiments, the session logic engine is configured to establish the predefined content increment as an alphanumeric character. In some instances, the protected media content may comprise media, such as software code or string variables, that may not be readily segmented into separate words or lines. For example, session logic engine in some cases may utilize an active cursor to determine a number of alphanumeric characters consumed by a user.

Likewise, session logic engine 116 is configured to apply the designated media content increments based on a predefined setting established by the content provider merchant entity. For example, protected media content 120 that is consumed by a user can be monitored and measured by session logic engine 116 either by duration (e.g., seconds or minutes of protected media content viewed), by data amount (e.g., number of bytes of protected media content that is communicated/consumed or a number of pages read), or by some other quantifying metric. Session logic engine 116 can also be configured to display the cost of the particular streaming payment session in a lowest increment of the local currency in the user's screen display (e.g., top right hand corner).

In some embodiments, streaming payment engine 112 is provisioned with a mapping database 122 that includes entries that map and/or correlate predefined media content increments to minimum currency increments. For example, mapping database 122 includes a plurality of various mappings that establish the smallest possible granularity or increments with regard to both currency and content. Examples of a predefined content increments can include a number of words, characters, inches, pixels, pages, bytes corresponding to the media content to be streamed. By establishing these mappings that represent the predefined content and minimum currency increments, streaming payment engine 112 is able to provide media content to a user in a fluid manner. Notably, these mappings include session expense ratios (e.g., 100 kilobytes/$0.01, 1 page read or accessed/$0.01, 5 second duration/$0.01, etc.) that establish the rate of payment incurred for continued access or consumption to protected media content. Other examples representative of the flexibility of the various mappings that can be established include pay-per-second of live video media, pay-per-page of electronic book media, pay per word for live chat media, and/or the like. In some embodiments, session logic engine 116 is configured to access the mappings in database 122.

After a user with an on-demand streaming payment subscription visits the paywall site and attempts to access the paywall content (e.g., protected media content 120), session logic engine 116 can initiate the session. In some embodiments, session logic engine 116 may initiate the session by starting a session timer or clock and determining a minimum session expense ratio that is based on the minimum currency increment and the predefined content increment (e.g., a mapping entry in database 122). After initiating the session, session logic engine 116 is configured to designate the session status as being 'active'. While the session is operating in an active state, session logic engine 116 is configured to permit the user to have unlimited access to protected media content 120. While the user is allowed to have access to protected media content 120, session logic engine 116 maintains a live, up-to-date payment amount based on the minimum session expense ratio (along with either i) the time transpired or ii) the amount of content consumed/accessed since the initiation of the session).

At some point in time after the media session is initiated, the user ultimately exits or leaves the paywall website for one of any number of reasons. As described in more detail below, the web browser that the user is utilizing may be intentionally or unintentionally closed, the UE device may shutdown for some reason (i.e., restart, low battery, etc.), or the like. Once the web browser is closed, the user's session is placed in a tentative "hold" or "timeout" state by session logic engine 116. If the user resumes the session before the expiration of a predefined time period (e.g., 15 minute window that is predesignated by the content provider merchant entity), then the user's original session resumes. Otherwise, the session is completely terminated and finalized. Once the session is terminated, session logic engine 116 is configured to generate and send a transaction payload message to settlement engine 118. Contents of the transaction payload message is described in greater detail below.

After receiving the transaction payload message from session logic engine 116, settlement engine 118 determines the user's preferred payment method type. For example, settlement engine 118 can be configured to parse the transaction payload message in order to extract the included preferred payment method data. In the event settlement engine 118 determines that a credit card or debit card is designated as the preferred payment method, settlement engine 118 routes the transaction to an acquirer bank entity 126 associated with the content provider merchant entity. At that point, the settlement is handled through existing credit card or debit card processing flows. In the event settlement engine 118 determines that the payment method is an electronic wallet, settlement engine 118 routes the transaction to a DLT based facilitator 128. Afterwards, a smart contract is established between the merchant and the customer. Notably, the customer is permitted to set parameters by which the merchant is allowed to charge per the smart contract. In some embodiments, the smart contract between the merchant and the customer defines customer set limits that the merchant must comply with or the charge will not be executed by the DLT based facilitator 128. Once the smart contract is established, the merchant is permitted to charge the customer through existing processing flows.

In some embodiments, customer user can select a electronic wallet as his/her preferred payment method. In response, the enrollment engine will initiate an identification and verification (IDV) SDK corresponding to the electronic wallet selected. Afterwards, the IDV SDK and/or the enrollment engine generates a smart contract template that includes entry fields that permit the customer user to input and establish his limits/terms for the smart contract with the content provider entity. Upon completion of the smart contract template, the user indicates his agreement to proceed with the smart contract (e.g., e-signs, checks a box, etc.). After receiving the user's agreement indication, the enrollment engine will verify the presence of DLT based electronic funds and place a tentative hold on the specified DLT based electronic fund amount until the terms of the smart contract is satisfied by both smart contract parties (i.e., the smart contract can function as a pre-authorization and/or hold on DLT based electronic funds).

In the event settlement engine 118 determines that the payment method is a bank account, settlement engine 118 routes the transaction to an automated clearing house (ACH) processor 130, which functions as a receiving depository financial institution (RDFI) for the content provider merchant entity. At that point, the request for payment is routed by ACH processor 130 to the originating depository financial institution (ODFI) that services the customer user. Notably, the payment is facilitated through a designated settlement system, such as a local ACH processor or via real-time payment network(s).

Figure 2:
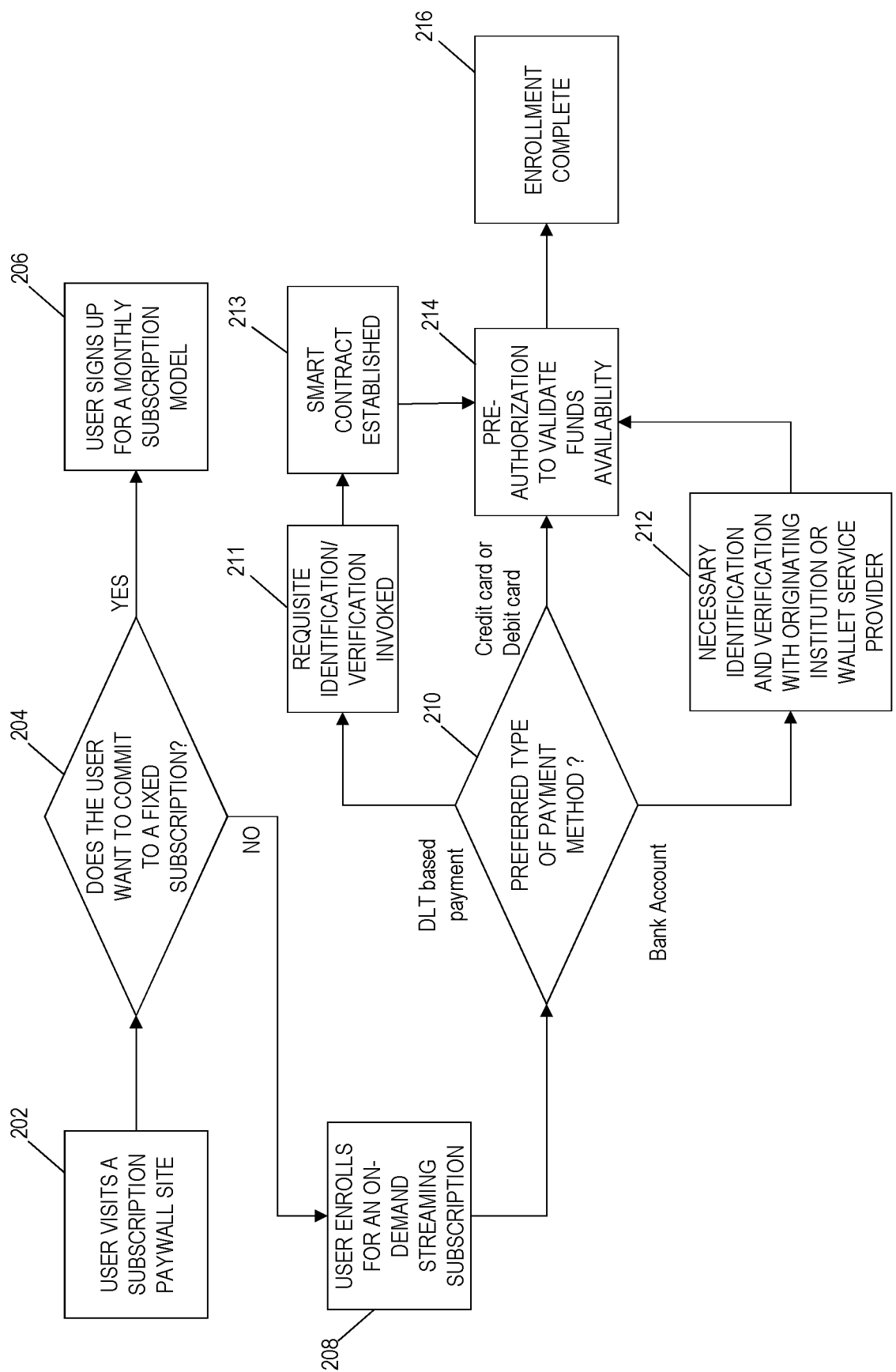
FIG. 2 depicts a flowchart that illustrates an exemplary process for enrolling in a streaming payment platform according to an embodiment of the subject matter described herein.

Additional description regarding the exemplary operation of each of the enrollment engine, the session logic engine, and the settlement logic engine are provided below and shown in FIGS. 2-4. For example, FIG. 2 depicts a flowchart that illustrates an exemplary process 200 for enrolling in an on-demand streaming payment platform according to an embodiment of the subject matter described herein. In some embodiments, process 200 can be conducted by a session enrollment engine that is stored in memory and executed by a processing device (e.g., as shown in FIG. 1). In block 202, a customer user utilizes a UE device to visit and access a content provider's subscription paywall site. Notably, the user utilizes a web browser or some other user interface supported by the UE device to request access to a content provider's protected media content (e.g., content protected by a paywall). As indicated above, the UE device can include a mobile device, a desktop computer, a laptop computer, a set-top box, a digital streaming media player device, a smart television, or the like. Upon visiting the content provider's web site and attempting to access the protected media content, the user will be presented with a sign-in and enrollment page (i.e., the user will be prompted to enroll if the user is not a registered user, otherwise the user will enter his registration credentials/password). For example, the enrollment page may comprise a graphical user interface comprising entry fields or pulldown options that can be used by the content provider merchant entity to request and receive enrollment information from a user (e.g., a prospective subscription customer and/or enrollee).

In block 204, a determination whether the user would like to register for a fixed subscription (e.g., a traditional subscription model) is made. If the user decides to commit to a traditional/fixed subscription, then process 200 continues to block 206 where the user is able to register for a monthly subscription model (or the like) in a conventional manner. Otherwise, process 200 proceeds to block 208 where the user selects to register for an "on-demand streaming payment subscription". For example, the user may enroll in the on-demand streaming payment subscription model by providing his/her name, email address, billing information, user device identifier (e.g., mobile device number, MAC address, etc.), and/or a preferred settlement type (e.g., a preferred payment method).

In block 210, a determination is made as to the preferred settlement type that is selected by the user. If the user decides to utilize a credit payment card or a debit payment card, then process 200 continues to block 214 where the enrollment engine proceeds to conduct a pre-authorization of the payment card in order to validate the availability of funds. In contrast, if the user decides to utilize a bank account or an electronic account/wallet, process 200 continues to block 212 where the necessary identification and verification with an originating banking institution is conducted. Afterwards, process 200 continues to block 214 where the pre-authorization is conducted by the enrollment engine in the manner as described above.

Alternatively, if the user decides to utilize a electronic wallet option, then process 200 continues to block 211 where the requisite identification and verification for that electronic wallet is invoked. For example, the enrollment engine can initiate an IDV SDK corresponding to the electronic wallet selected. Afterwards, the enrollment engine is configured to generate a smart contract that enables the customer user to establish his limits and/or terms for the smart contract with the content provider entity (see block 213). More specifically, the smart contract between the content provider merchant and the customer would specify customer set limits that the merchant must adhere/follow or the DLT based electronic payment for the accessed protected media content will not be executed. Upon completion of the smart contract terms, the user electronically signs or indicates his agreement to proceed with the smart contract. After the smart contract is established and the user's agreement indication is received by the enrollment engine, process 200 continues to block 214 where the enrollment engine will verify the presence of DLT based electronic funds and place a tentative hold on the specified DLT based electronic fund amount until the terms of the smart contract is satisfied by both smart contract parties.

After the fund availability is validated during the pre-authorization stage of block 214, process 200 continues to block 216 where the enrollment process is completed.

Figure 3:
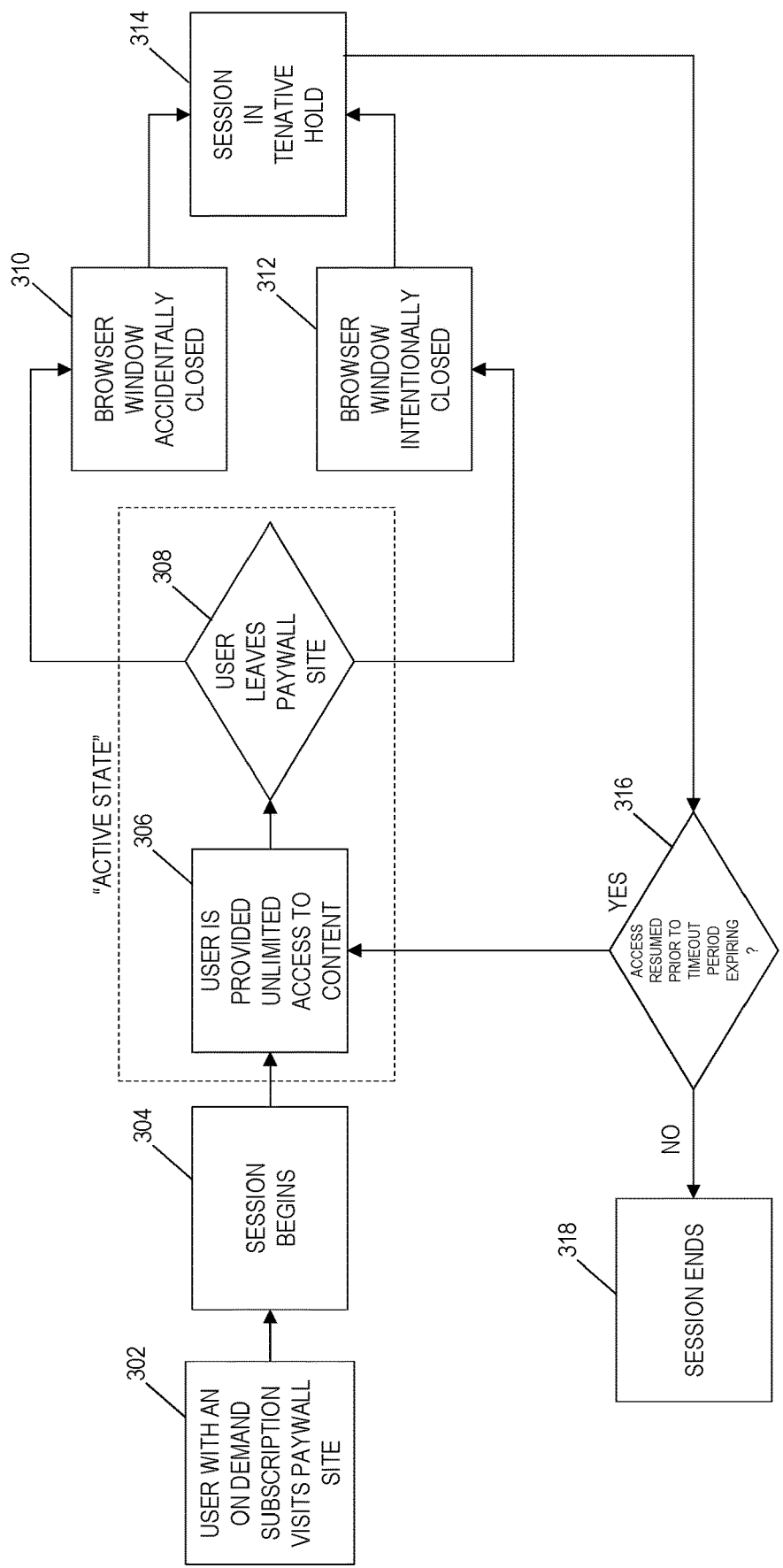
FIG. 3 is a flowchart depicting an exemplary process that illustrates the session logic involved for electronically facilitating streaming payments according to an embodiment of the subject matter described herein.

FIG. 3 depicts a flowchart of an exemplary process 300 illustrating the session logic involved for electronically managing and facilitating the streaming payment platform according to an embodiment of the subject matter described herein. In block 302, a user enrolled with an on-demand streaming payment subscription visits a paywall site. For example, a customer may utilize a UE device to access a content provider's premium "paywall" media content (e.g., protected media content). Process 300 subsequently continues to block 304 where the session logic engine initiates the session. In some embodiments, block 304 includes the session logic engine initiating a session timer that begins upon the user being provided access to the protected media content. After the session is initiated, the session logic engine designates the user's current session status/state as 'Active' and the user is provided with unlimited access to the protected media content hosted by the paywall site (see block 306). Notably, the session remains in an 'active state' until the user leaves the paywall site (see block 308). In some embodiments, the session duration and access cost/expenses can be displayed in a "always-on" display window in a GUI/screen location (e.g., top right-hand corner of display) that is predefined by the content provider merchant entity.

In block 308, a determination as to why the user leaves the content provider's paywall site is determined. In some embodiments, the session logic engine is responsible for determining the manner in which the user ceases the viewing or access of the protected media content. For example, process 300 continues to block 310 if the browser window utilized by the user is closed accidentally closure, user's computer crashes or unexpectantly starts updating/restarting itself, etc.). Alternatively, process 300 continues to block 312 if the user intentionally closes the browser window.

If the UE device's browser window is closed (accidentally or intentionally), process 300 continues to block 314 where the session is placed in a "tentative hold" state. In particular, the session logic engine can place the session on hold for a predefined time period (e.g., 15 minutes). This predefined time period may be referred to as a "session closure window" or "timeout". For example, the session logic engine can include a timer or clock that keeps track of the amount of time that expires while the user session is in the session closure window. Placing the user's session on a tentative hold in this manner can avoid the creation of a plurality of unnecessary sessions and the multiple settlement transactions that ultimately result from these sessions.

Process 300 continues to block 316 where the session logic engine determines if the user resumes the original session (i.e., to access the protected media content) prior to the expiration of the timeout period. If the user resumes the session in the allotted time, then process 300 loops back to block 306 where the session logic engine is configured to resume the session at the point the session was detected as being "inactive" or on "hold". The session logic engine further designates the session as being "active" in block 306.

Alternatively, if the predefined time period expires, process 300 continues to block 318 where the session logic engine is configured to terminate the session and designate the session status as "complete". Once the session is designated as complete, the session logic engine also initiates a settlement flow (e.g., communicating a trigger message to the settlement engine) in response to the termination/completion of the session. In some embodiments, the session logic engine generates and sends a 'transaction payload message' to the session settlement engine to initiate or trigger the settlement flow (shown in FIG. 4). The transaction payload message can include the user/customer's name, the customer's billing address, the financial transaction amount, the session duration, the minimum currency increment, an order reference number, and/or the customer's settlement routing preference designation (e.g., credit, debit, bank account, DLT based electronic payment, etc.). In some embodiments, the communication of the transaction payload message comprises the communication of an instruction from a first SDK (e.g., the session logic engine) to a second SDK (e.g., the settlement engine) located within the streaming payment engine that is executed on the content provider server.

Figure 4:
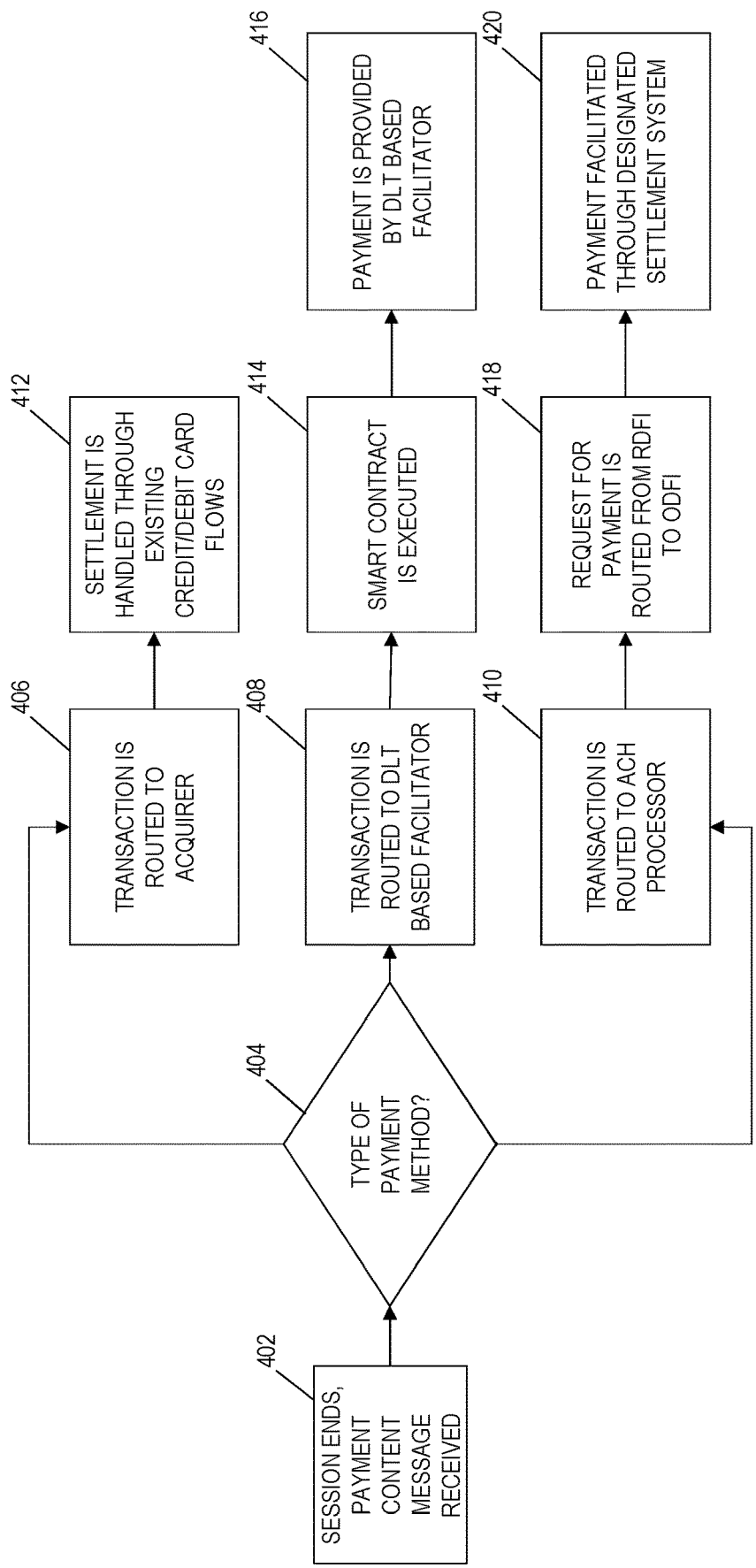
FIG. 4 depicts a flowchart that illustrates the settlement logic involved for electronically facilitating streaming payments according to an embodiment of the subject matter described herein.

FIG. 4 is a flowchart depicting an exemplary process 400 that illustrates the settlement logic involved for electronically facilitating streaming payments according to an embodiment of the subject matter described herein. In block 402, the settlement engine receives the transaction payload message from the session logic engine after the user's session status has been designated as completed (and thus previously terminated by the session logic engine). As described above, the session logic engine is configured to generate a transaction payload message (e.g., a settlement trigger message) that includes transaction payload content data. For example, the transaction payload content data can include a user/customer's name, a billing address, a final transaction amount, a session duration, a currency type (e.g., in the lowest denomination for increment of the local currency), an order or reference identifier, and/or a settlement routing preference (e.g., credit, debit, bank account number, electronic wallet, etc.) data.

In block 404, the transaction payload message is processed by the settlement engine. Namely, the settlement engine can be configured to determine what type of payment method was designated by the user. For example, the settlement engine is adapted to access the received transaction payload content message and extract the settlement routing preference data from the payload section of the message. If the settlement engine determined that the designated payment method includes a credit or debit payment card, process 400 continues to block 406 where the settlement engine is configured to route the transaction information to an acquirer entity (e.g., an acquirer bank that supports the content provider merchant's credit account). After receiving the transaction information from the settlement engine, the acquirer entity handles the payment settlement transaction through existing credit or debit card processing flows (see block 412).

Alternatively, process 400 continues to block 408 (from block 404) if the settlement engine determines that the designated payment method is indicated as a DLT based electronic transaction. In such a scenario, the DLT based electronic transaction and smart contract are routed by the settlement engine to a DLT based facilitator entity. After receiving the routed transaction, the DLT based facilitator entity processes the smart contract that was previously established between the content provider merchant and the customer during the enrollment process (see block 414). In block 416, the customer user is presented with an option to create a new smart contract. For example, the settlement engine may either send a trigger message to the enrollment engine to set up a new smart contract (as described above) or may be configured itself to establish the new smart contract in the same manner as the enrollment engine. Notably, the new smart contract is need for the customer user to regain access and/or re-entry into the paywall site and access the protected media content. Alternatively, the customer user may indicate the preference to select another preferred payment method.

Returning to block 404, the settlement engine can instead determine that the payment method to be used is a bank account. In such a scenario, the transaction is routed by the settlement engine to an ACH processing entity (e.g., see block 410). The ACH processing entity can be the bank entity (e.g., the RDFI) that hosts the content provider's bank account. In block 418, a request for payment is routed from the ACH processing entity (e.g., the RDFI associated with the content provider merchant) to the user's checking or savings account from which payment will ultimately be provided (e.g., the ODFI or bank associated with the user). In block 420, payment is facilitated through that designated settlement system (e.g., local ACH entity or real time payment network). For example, the ODFI can be configured to provide the payment amount to the requesting RDFI servicing the content provider merchant's account.

Figure 5:
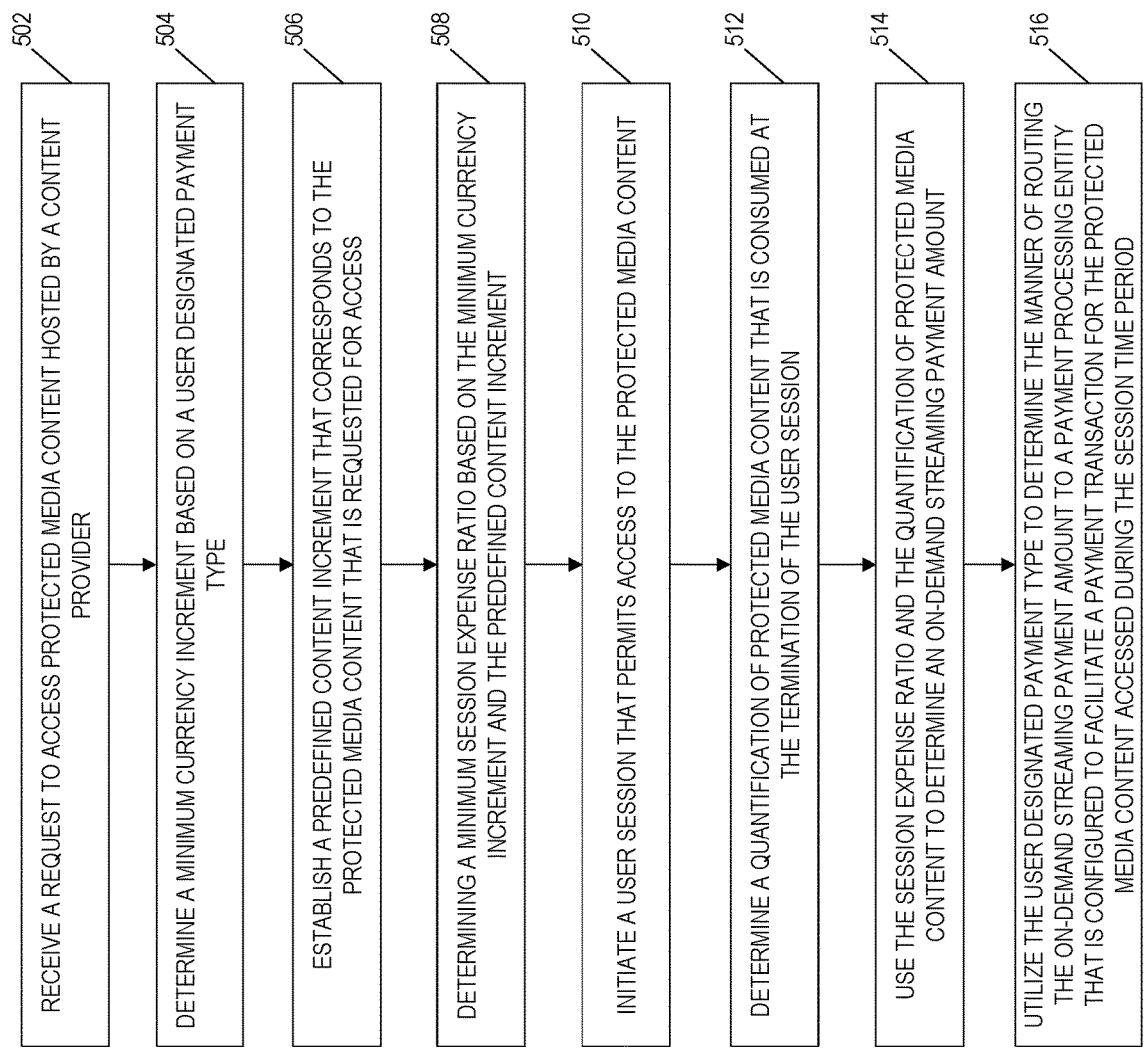
FIG. 5 is a schematic illustrating a flowchart for electronically facilitating streaming payments according to an embodiment of the subject matter described herein.

FIG. 5 is a schematic block diagram illustrating an exemplary process 500 for electronically facilitating streaming payments according to an embodiment of the subject matter described herein. In some embodiments, process 500 can include an algorithm stored in memory of a content provider server and performs blocks 502-516 when executed by a processor of the content provider server.

In block 502, a request to access protected media content hosted by a content provider is received. In some embodiments, a subscriber user utilizes user equipment device to request protected media content positioned behind a paywall. For example, the subscriber user may attempt to access the protected media content using a web browser hosted by a desktop computer, a mobile device, a streaming player device, or the like. The request may be received by a streaming payment host server.

In block 504, a minimum currency increment based on a user designated payment type is determined. In some embodiments, the streaming payment host server determines a minimum currency increment. For example, the minimum currency increment can be predefined in the subscriber profile established by the subscriber user during the enrollment process of the on-demand streaming payment service. One example of a minimum currency increment for U.S. currency is one cent.

In block 506, a predefined content increment that corresponds to the protected media content that is requested for access is established. In some embodiments, a session logic engine or the streaming payment host server is configured to access a database that maps various currency increments to a designated type of media content that is being accessed. For example, the protected media content hosted by a content provider server may comprise a number of articles for consumption and, thus may be associated with a predefined content increment, e.g., an increment that is measurable or quantifiable by a number of pages displayed and/or accessed/consumed by the user.

In block 508, a minimum session expense ratio based on the minimum currency increment and the predefined content increment is determined. In some embodiments, the session logic engine is configured to calculate a minimum session expense ratio that is associated with the protected media content that is being accessed. For example, the session logic engine can determine a minimum session expense ratio by dividing the minimum currency increment by the predefined content increment corresponding to the protected media content being accessed (e.g., $0.01/1 byte or $0.01/1 second).

In block 510, a user session that permits access to the protected media content is initiated. In some embodiments, the session logic engine is configured to initiate a streaming media session subject to the on-demand streaming model that is based on the minimum session expense ratio determined in block 508. For example, the session logic engine may be configured to start a timer concurrently with the initiation of the streaming media session.

In block 512, a quantification of protected media content that is accessed at a termination of the user session is determined. In some embodiments, the session logic engine detects that the browser utilized to access the protected media content is closed. In such an event, the session logic engine temporarily places the session in a "hold" state. After a predefined period of time (e.g., a time period that which can be configured by a system operator), the session logic engine can finalize and terminate the current streaming session.

In block 514, the session expense ratio and the quantification of protected media content is used to determine an on-demand streaming payment amount. In some embodiments, the session logic engine is configured to determine a session length of time. For example, the session length can represent the amount of time that transpired while the user accessed the protected media content. In other embodiments, the session logic engine can determine the number of pages or the amount of data that is consumed or viewed while the session is in an active state (e.g., the period of time in which the protected media content is accessed).

In block 516, the user designated payment type is utilized to determine a manner of routing the on-demand streaming payment amount to a payment processing entity that is configured to facilitate a payment transaction for the protected media content accessed during the session time period. In some embodiments, the session logic engine is configured to communicate content payload message that contains the user's preferred payment method and the corresponding payment amount calculated for the on-demand access of the protected media content to a settlement engine. The settlement engine can be configured to extract the preferred payment type in the message and determine the manner of routing the transaction to the appropriate payment entity.

It will be appreciated that exemplary process 500 is for illustrative purposes only and that different and/or additional actions may be used. It will also be appreciated that various actions associated with exemplary process 500 may occur in a different order or sequence.

Systems, methods, and computer readable media for electronically facilitating streaming payments may afford, for example and without limitation, one or more of the following beneficial technical effects: facilitating electronic payments; providing a new subscription model option to the merchant and potential consumer such that the described on-demand streaming payment subscription model option presents an opportunity to increase the size of the content provider's user/customer base; providing the consumer user with a more personalized and flexible media consumption experience; and providing the consumer with the ability to select a convenient payment method from among multiple payment options, including include real-time payment networks and DLT based facilitators.

While the subject matter has been described herein in reference to specific aspects, embodiments, features, and illustrative embodiments, it will be appreciated that the utility of the subject matter is not thus limited. Rather, the utility extends to and encompasses numerous other variations, modifications and alternative embodiments, as will suggest themselves to those of ordinary skill in the field of the present subject matter, based on the disclosure herein.

Various combinations and sub-combinations of the structures and features described herein are contemplated, and will be apparent to a skilled person having knowledge of this disclosure. Any of the various features and elements as disclosed herein can be combined with one or more other disclosed features and elements unless indicated to the contrary herein. Correspondingly, the subject matter as hereinafter claimed is intended to be broadly construed and interpreted, as including all such variations, modifications and alternative embodiments, within its scope and including equivalents of the claims.

What is claimed is:

1. A method for electronically facilitating streaming payments, the method comprising:

receiving a request from a user equipment device associated with a subscriber user to access protected media content hosted by a content provider server;

determining, by a streaming payment engine stored in the content provider server, a minimum currency increment that is predefined in a subscriber profile associated with the subscriber user;

establishing, by the streaming payment engine, a predefined content increment that corresponds to the protected media content that is requested for access, wherein the predefined content increment is determined by the streaming payment engine using a number of pixels displayed on the user equipment;

determining, by the streaming payment engine, a minimum session expense ratio that is defined by dividing the minimum currency increment by the predefined content increment;

initiating, by the streaming payment engine, a user streaming media session that permits access to the protected media content;

determining, by the streaming payment engine at a termination of the user streaming media session, a quantification of protected media content that is accessed during the user streaming media session;

using, by the streaming payment engine, the minimum session expense ratio and the quantification of protected media content to determine an on-demand streaming payment amount associated with the user streaming media session;

utilizing, by the streaming payment engine, the user designated payment type to determine a manner of routing the on-demand streaming payment amount to a payment processing entity that is configured to facilitate a payment transaction for the protected media content accessed during the user streaming media session; and visually presenting a current on-demand streaming payment amount in units based on the minimum currency increment during the access of the protected media content on at least a portion of a screen display that is also used to present the protected media content;

wherein the user streaming media session is placed on hold up to a predefined time period after the access to the protected media content ceases;

wherein the user streaming media session is terminated if the predefined time period expires.

2. The method of claim 1 further comprising receiving an enrollment indication message containing the user designated payment type for a streaming payment subscription associated with protected media content.

3. The method of claim 1 wherein the user streaming media session is resumed if the access to the protected media content is continued prior to an expiration of the predefined time period.

4. The method of claim 1 wherein the quantification of protected media content is measured using at least one of: a number of bytes, a number of words, a number of web pages, a number of images, or an amount of elapsed time.

5. A system for electronically facilitating streaming payments, the system comprising:

a content provider server comprising at least one processor and memory;

a session logic engine stored in the memory and when executed by the at least one processor is configured to receive a request from a user equipment device associated with a subscriber user to access protected media content hosted by a content provider, determine a minimum currency increment that is predefined in a subscriber profile associated with the subscriber user, establish a predefined content increment that corresponds to the protected media content that is requested for access, wherein the predefined content increment is determined by the streaming payment engine using a number of pixels displayed on the user equipment, determine a minimum session expense ratio that is defined by dividing the minimum currency increment by the predefined content increment, initiate a user streaming media session that permits access to the protected media content, determine, at a termination of the user streaming media session, a quantification of protected media content that is accessed during the user streaming media session; and a session settlement engine stored in the memory and when executed by the at least one processor is configured to use the minimum session expense ratio and the quantification of protected media content to determine an on-demand streaming payment amount and utilize the user designated payment type to determine a manner of routing the on-demand streaming payment amount to a payment processing entity that is configured to facilitate a payment transaction for the protected media content accessed during the user streaming media session;

wherein the content provider server is further configured to visually present a current on-demand streaming payment amount in units based on the minimum currency increment during the access of the protected media content on at least a portion of a screen display that is also used to present the protected media content;

wherein the session logic engine is further configured to place the user streaming media session on hold up to predefined time period after the access to the protected media content ceases;

wherein the session logic engine is further configured to terminate the user streaming media session if the predefined time period expires.

6. The system of claim 5 wherein the content provider server is further configured to receive an enrollment indication message containing the user designated payment type for a streaming payment subscription associated with protected media content.

7. The system of claim 5 wherein the session logic engine is further configured to resume the user streaming media session if the access to the protected media content is continued prior to an expiration of the predefined time period.

8. The system of claim 5 wherein the quantification of protected media content is measured using at least one of: a number of bytes, a number of words, a number of web pages, a number of images, or an amount of elapsed time.

9. A non-transitory computer readable medium having stored thereon executable instructions that when executed by a processor of a computer control the computer to perform steps comprising:

receiving a request from a user equipment device associated with a subscriber user to access protected media content hosted by a content provider server;

determining, by a streaming payment engine stored in the content provider server, a minimum currency increment that is predefined in a subscriber profile associated with the subscriber user;

establishing, by the streaming payment engine, a predefined content increment that corresponds to the protected media content that is requested for access, wherein the predefined content increment is determined by the streaming payment engine using a number of pixels displayed on the user equipment;

determining, by the streaming payment engine, a minimum session expense ratio that is defined by dividing the minimum currency increment by the predefined content increment;

initiating, by the streaming payment engine, a user streaming media session that permits access to the protected media content;

determining, by the streaming payment engine at a termination of the user streaming media session, a quantification of protected media content that is accessed during the user streaming media session;

using, by the streaming payment engine, the minimum session expense ratio and the quantification of protected media content to determine an on-demand streaming payment amount;

utilizing, by the streaming payment engine, the user designated payment type to determine a manner of routing the on-demand streaming payment amount to a payment processing entity that is configured to facilitate a payment transaction for the protected media content accessed during the user streaming media session;

visually presenting a current on-demand streaming payment amount in units based on the minimum currency increment during the access of the protected media content on at least a portion of a screen display that is also used to present the protected media content;

wherein the user streaming media session is placed on hold up to a predefined time period after the access to the protected media content ceases;

wherein the user streaming media session is terminated if the predefined time period expires.

10. The non-transitory computer readable medium of claim 9 comprising receiving an enrollment indication message containing the user designated payment type for a streaming payment subscription associated with protected media content.

11. The non-transitory computer readable medium of claim 9 wherein the user streaming media session is resumed if the access to the protected media content is continued prior to an expiration of the predefined time period.

* * * * *